(12) United States Patent
Miyakawa et al.

(10) Patent No.: US 7,368,076 B2
(45) Date of Patent: May 6, 2008

(54) METHOD FOR PRODUCING A SILICON NITRIDE FILTER

(75) Inventors: Naomichi Miyakawa, Yokohama (JP); Nobuhiro Shinohara, Yokohama (JP); Toshinari Watanabe, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 520 days.

(21) Appl. No.: 10/892,200

(22) Filed: Jul. 16, 2004

(65) Prior Publication Data

US 2005/0023735 A1  Feb. 3, 2005

(30) Foreign Application Priority Data

Jul. 17, 2003  (JP)  ............................. 2003-276170

(51) Int. Cl.
C04B 33/32 (2006.01)
C04B 35/00 (2006.01)

(52) U.S. Cl. ...................... 264/628; 264/630; 264/647; 264/683

(58) Field of Classification Search ................ 264/683, 264/43, 628, 44, 630, 647, 42, 82, 653, 676, 264/29.7, 626
See application file for complete search history.

(56) References Cited

U.S. PATENT DOCUMENTS

| | | | |
|---|---|---|---|
| 3,960,581 A * | 6/1976 | Cutler | ........................ 501/98.1 |
| 6,565,797 B2 | 5/2003 | Miyakawa et al. | |
| 6,593,261 B2 | 7/2003 | Shinohara et al. | |
| 6,849,213 B2 * | 2/2005 | Miyakawa et al. | ........... 264/44 |
| 6,869,902 B2 * | 3/2005 | Inoue et al. | ................ 501/97.1 |
| 7,135,140 B2 * | 11/2006 | Shinohara et al. | .......... 264/683 |
| 2005/0023735 A1 | 2/2005 | Miyakawa et al. | |

FOREIGN PATENT DOCUMENTS

| | | |
|---|---|---|
| EP | 1 160 223 A1 | 12/2001 |
| EP | 1 197 253 A1 | 4/2002 |
| GB | 1 426 216 | 2/1976 |
| GB | 1546928 A2 * | 5/1979 |
| JP | 52-121613 | 10/1977 |
| JP | 6-256069 | 9/1994 |
| JP | 7-187845 | 7/1995 |
| JP | 8-59364 | 3/1996 |
| JP | 2002-284585 | 10/2002 |
| WO | WO 01/47833 | 7/2001 |
| WO | WO 2004/050318 A1 | 6/2004 |

OTHER PUBLICATIONS

U.S. Appl. No. 11/240,509, filed Oct. 3, 2005, Shinohara et al.
U.S. Appl. No. 11/287,461, filed Nov. 28, 2005, Shinohara et al.
J. Heinrich, et al., "Microstructure and Mechanical Properties of Reaction Bonded Silicon Nitride", Energy and Ceramics, Proceedings of the 4th International Meeting on Modern Ceramics Technologies, XP-008063178, 1980, pp. 780-792.
U.S. Appl. No. 11/415,138, filed May 2, 2006, Shinohara et al.
U.S. Appl. No. 10/892,200, filed Jul. 16, 2004, Miyakawa et al.
U.S. Appl. No. 10/216,815, filed Aug. 13, 2002, Miyakawa et al.
U.S. Appl. No. 09/975,262, filed Oct. 12, 2001, Miyakawa.
U.S. Appl. No. 10/140,162, filed May 8, 2002, Miyakawa.
U.S. Appl. No. 10/901,171, filed Jul. 29, 2004, Shinohara et al.
U.S. Appl. No. 10/900,090, filed Jul. 28, 2004, Matsuzaki et al.
U.S. Appl. No. 10/901,158, Jul. 29, 2004, Suzuki et al.

* cited by examiner

Primary Examiner—Carlos Lopez
(74) Attorney, Agent, or Firm—Oblon, Spivak, McClelland, Maier & Neustadt, P.C.

(57) ABSTRACT

A method for producing a silicon nitride filter, which comprises heat-treating in nitrogen a green body comprising from 60 to 95 mass % of metal silicon particles having an average particle diameter of from 10 to 75 μm, wherein particles having particle diameters of from 5 to 100 μm are at least 70 mass % in the entire metal silicon particles, and from 5 to 40 mass % of a pore-forming agent, to convert metal silicon substantially to silicon nitride. More preferably, the green body contains at least one member selected from the group consisting of an inorganic acid salt, an organic acid salt and a hydroxide containing at least one metal element selected from the group consisting of Mg, Ca, Fe and Cu.

7 Claims, No Drawings

METHOD FOR PRODUCING A SILICON NITRIDE FILTER

The present invention relates to a silicon nitride filter suitable for removing powder dust contained in a high temperature exhaust gas.

Silicon nitride has characteristics excellent in heat resistance, corrosion resistance, chemical resistance, mechanical strength, etc. and is expected to be useful for a filter (hereinafter referred to as DPF) for removal of fine particles (hereinafter referred to as particulates) discharged from a diesel engine or for a filter for collection or removal of dust under a high temperature or corrosive environment. Methods for producing such silicon nitride filters may generally be classified on the basis of starting materials into a production method wherein silicon nitride particles are used as the starting material (JP-A-6-256069, JP-A-7-187845, JP-A-8-59364) and a production method wherein metal silicon particles are used as the starting material (JP-A-52-121613, WO01/47833, JP-A-2002-284585). A production method wherein metal silicon particles are used as the starting material, and silicon nitride is produced by direct nitriding, has a characteristic such that the material cost is usually low as compared with a production method wherein silicon nitride particles are used as the starting material, and thus it is superior from the viewpoint of the production cost.

As a conventional technique for the production method wherein metal silicon is used as the starting material, a method has been proposed wherein a silicon nitride porous body is obtained by nitriding treatment of a green body made of fine metal silicon powder (JP-A-52-121613). However, in order to obtain a porous body having a high porosity, it is necessary to subject a metal silicon green body having a low density of the green body to nitriding treatment, and in such a case, fine, whisker-like silicon nitride fibers are likely to form on the surface or in the interior, whereby the average pore diameter of the porous body tends to be small.

As a means to solve such a problem, a method has been proposed in which a green body comprising from 40 to 90% of metal silicon particles having an average particle diameter of from 1 to 200 µm and from 10 to 60% of a pore-forming agent, is thermally treated in nitrogen to obtain a silicon nitride porous body having an average pore diameter of from 5 to 40 µm (WO01/47833). However, even by this method, when the product is used as DPF, it is still required to have a lower pressure loss and a higher efficiency for collecting particulates.

Further, a method has been proposed in which a green body composed mainly of metal silicon is prepared, and before nitriding the obtained green body composed mainly of metal silicon, the atmosphere is controlled to remove an oxide on the surface of metal silicon, and then, nitrogen gas is introduced to nitride metal silicon thereby to obtain a silicon nitride porous body (JP-A-2002-284585). However, even by this method, it is difficult to obtain a silicon nitride porous body having a sufficiently large porosity or pore diameter, and there is a problem also from the viewpoint of the productivity such that the atmosphere control is required prior to the nitriding treatment of metal silicon, whereby it is not possible to use a continuous firing furnace excellent in the productivity.

It is an object of the present invention to provide a method for producing a silicon nitride filter suitable as DPF which is excellent in mechanical properties and has a low pressure loss and a particularly high efficiency for collecting particulates, wherein metal silicon particles are used as the starting material.

The present invention provides a method for producing a silicon nitride filter, which comprises heat-treating in nitrogen a green body comprising from 60 to 95 mass % of metal silicon particles having an average particle diameter of from 10 to 75 µm, wherein particles having particle diameters of from 5 to 100 µm are at least 70 mass % in the entire metal silicon particles, and from 5 to 40 mass % of a pore-forming agent, to convert metal silicon substantially to silicon nitride.

By this method, it is possible to readily produce a silicon nitride filter having pore characteristics such that the average pore diameter and the porosity are large, and the proportion of pores having large pore diameters is high. Further, the silicon nitride filter obtainable by this method has high strength and is excellent also in heat resistance, corrosion resistance and chemical resistance, whereby it is particularly suitable as DPF which is required to have strength, heat resistance, corrosion resistance, durability, etc.

In the method for producing a silicon nitride filter of the present invention (hereinafter referred to as the present method), a green body is used which comprises from 60 to 95 mass % of metal silicon particles having an average particle diameter of from 10 to 75 µm, wherein particles having particle diameters of from 5 to 100 µm are at least 70 mass % in the entire metal silicon particles, and from 5 to 40 mass % of a pore-forming agent.

The metal silicon particles to be used in the present method have an average particle diameter of from 10 to 75 µm. If the average particle diameter of the metal silicon particles is less than 10 µm, the average pore diameter of the obtainable filter will be at most 5 µm, such being undesirable. Further, if the average particle diameter of the metal silicon particles exceeds 75 µm, the average pore diameter of the obtainable silicon nitride filter may be large, but nitriding may not necessarily be sufficient, such being undesirable. The average particle diameter of the metal silicon particles is preferably from 15 to 65 µm, and it is further preferred that the average particle diameter of the metal silicon particles is from 20 to 60 µm.

The metal silicon particles to be used in the present method not only have an average particle diameter of from 10 to 75 µm, but also particles having particle diameters within a range of from 5 to 100 µm, are at least 70 mass % in the entire metal silicon particles. When particles having particle diameters within a range of from 5 to 100 µm are at least 70 mass % in the entire metal silicon particles, pores having pore diameters of not more than 5 µm in the obtainable silicon nitride filter will decrease and yet it will be possible to efficiently collect particulates, etc. having agglomerated particle diameters of at least 10 µm. It is preferred that those having particle diameters within a range of from 5 to 100 µm are at least 85 mass % in the entire metal silicon particles, and it is more preferred that those having the particle diameters in the above range are at least 95 mass % in the entire metal silicon particles.

In the present method, it is preferred that metal silicon particles having particle diameters within a range of from 10 to 90 µm are at least 75 mass %. It is more preferred that metal silicon particles having particle diameters within a range of from 20 to 80 µm are at least 75 mass %. It is particularly preferred that metal silicon particles having particle diameters within a range of from 20 to 80 µm are at least 95 mass %. Metal silicon particles having a particle size distribution within such a specific range, can be obtained by suitably using a classification means such as a sieve or air stream classification. Further, the purity of the metal silicon particles is suitably selected depending upon the particular purpose or application.

In the present method, the content of metal silicon particles is from 60 to 95 mass % in the above green body. If the content of metal silicon particles in the green body is less than 60 mass %, the porosity of the silicon nitride filter thereby obtainable, tends to be too large, and the mechanical strength tends to be inadequate for practical use. On the other hand, if the content of metal silicon particles in the above green body exceeds 95 mass %, the porosity of the silicon nitride filter tends to be too small, whereby a function as a filter may not be obtained.

In the present method, the pore-forming agent is not particularly limited, so long as it is capable of forming pores. However, it is preferably oxide ceramic hollow particles (hereinafter referred to simply as hollow particles) and/or a dissipative pore-forming agent, whereby desired pores can be formed with a small amount of addition. The content of the pore-forming agent is from 5 to 40 mass % in the green body. If the content of the pore-forming agent in the green body is less than 5 mass %, the porosity of the silicon nitride filter tends to be too low, whereby a function as a filter may not be obtained. On the other hand, if the content of the pore-forming agent in the green body exceeds 40 mass %, the porosity of the silicon nitride filter tends to be too high, whereby the mechanical strength tends to be inadequate for a practical use.

As the above-mentioned hollow particles, crystalline or amorphous particles may suitably be used so long as they form pores at the time of heat treatment and they serve as a sintering aid to silicon nitride particles formed in the heat treatment process. The hollow particles are preferably those composed mainly of an oxide of at least one metal selected from the group consisting of Al, Si, Ca, Sr, Ba and Mg, since the effect as a sintering aid will thereby be high. The porous particles may have a portion corresponding to the outer shell being dense or porous so long as they are hollow. Further, the hollow particles are preferably spherical particles as their outer shape, since such particles are readily available. However, particles other than spherical particles may be acceptable so long as they are hollow.

As the above-mentioned dissipative pore-forming agent, an organic or inorganic material may suitably be used so long as it dissipates upon e.g. decomposition at the time of the heat treatment thereby to form pores. It is preferred that the dissipative pore-forming agent is organic polymer particles, particularly thermally decomposable polymer particles, since they will decompose and dissipate in the heat treatment process and will not retain a residue in the sintered body and thus they do not impair the properties of the obtainable silicon nitride filter. A material which may be thermally decomposed and burned off, may suitably be used. For example, an acrylic resin, a polyvinyl acetate resin or a silicone resin may be mentioned.

The average particle diameters of the hollow particles and the organic polymer particles are preferably from 10 to 100 μm, whereby the porosity of the obtainable silicon nitride filter will be high, and yet the strength will be secured. If the average particle diameter of the hollow particles, etc. is less than 10 μm, the contribution to formation of pores will decrease. On the other hand, if the average particle diameter of the hollow particles, etc. exceeds 100 μm, the strength of the obtainable silicon nitride filter tends to be inadequate, such being undesirable.

In the present method, the green body preferably contains an inorganic acid salt and/or organic acid salt containing at least one metal atom selected from the group consisting of Mg, Ca, Fe and Cu, whereby nitriding of metal silicon particles will be accelerated. The inorganic acid salt is not particularly limited, and a nitrate, a chloride or a sulfate may, for example, be mentioned. On the other hand, as the organic acid salt, a carboxylate such as an acetate or an oxalate may, for example, be mentioned. It is particularly preferably a water-soluble salt, whereby it can be added in the form of a solution to the green body, and the nitriding accelerating effect can be obtained with a small amount as compared with a case where it is added in the form other than a salt, such as an oxide. Usually, the smaller the amount of such an element to be added, the better, since the properties of the silicon nitride filter will less likely to be impaired. Among the above salts, a nitrate such as iron nitrate or a carboxylate may, for example, be preferred.

In the present method, a hydroxide containing at least one metal element selected from the group consisting of Mg, Ca, Fe and Cu may be used as a substitute for the inorganic salt or in combination with the inorganic salt and/or the organic salt. For example, in a process for preparing a material for extrusion molding by kneading with water, an inorganic acid salt readily soluble in water such as magnesium nitrate, is considered to be reacted with water to form a hydroxide. Accordingly, magnesium hydroxide may be used. Namely, it is preferred that the green body contains at least one member selected from the group consisting of an inorganic acid salt, an organic acid salt and a hydroxide containing at least one metal element selected from the group consisting of Mg, Ca, Fe and Cu, whereby nitriding of metal silicon particles will be accelerated.

In the present method, the above inorganic acid salt and/or organic acid salt is preferably added in an amount of from 0.1 to 3 parts by mass as a metal element, per 100 parts by mass of the amount of the metal silicon particles. If such an amount is less than 0.1 part by mass, no adequate effects of addition may be obtained, and if it exceeds 3 parts by weight, such a salt is likely to impair the properties such as heat resistance, of the silicon nitride filter. Such an amount is more preferably from 0.5 to 2 parts by mass.

In the present method, in a case where a hydroxide containing at least one metal element selected from the group consisting of Mg, Ca, Fe and Cu is used as a substitute for the inorganic acid salt or in combination with the inorganic acid salt and/or the organic acid salt, the hydroxide is preferably added in an amount of from 0.1 to 3 parts by mass as a metal element, per 100 parts by mass of the metal silicon particles. Such an amount is more preferably from 0.5 to 2 parts by mass.

In the present method, the pore-forming agent and the metal silicon particles may be mixed by using a common mixing means such as a ball mill or a mixer. As a method for preparing the green body comprising the pore-forming agent and the metal silicon particles, a usual ceramic-molding method such as press molding, extrusion molding or cast molding may suitably be employed. Further, at the time of molding, an organic binder may be added. As such an organic binder, an organic substance may be used such as polyvinyl alcohol or its modified product, starch or its modified product, carboxymethylcellulose, hydroxymethylcellulose, polyvinyl pyrrolidone, an acrylic acid or an acrylic copolymer, a vinyl acetate resin or a vinyl acetate copolymer.

As a condition for the heat treatment of the green body, preferred is heat treatment in two stages in a nitrogen atmosphere, i.e. it is preferably divided into a first stage suitable for nitriding metal silicon particles and a second stage suitable for sintering silicon nitride particles as the formed nitride.

As the heat treatment condition for the first stage, it is preferred to maintain the green body in a nitrogen atmosphere at a temperature of from 1,200 to 1,400° C. for from 4 to 12 hours. If the temperature is lower than 1,200° C., no adequate nitriding of metal silicon particles takes place. On the other hand, if the temperature exceeds 1,400° C., metal silicon particles tend to fuse in the vicinity of the fusing point (1,410° C.) of metal silicon, whereby the shape of the sintered body can not be maintained, such being undesirable. If the time for maintaining at the temperature is less than 4 hours, nitriding of metal silicon particles tends to be inadequate, such being undesirable. On the other hand, if the time for maintaining at such a temperature exceeds 12 hours, the nitriding reaction will no longer substantially proceed, and the operation cost will increase, such being undesirable.

As the condition for the heat treatment in the second stage, it is preferred to maintain the green body in a nitrogen atmosphere at a temperature of from 1,500 to 1,800° C. for from 1 to 12 hours. If the temperature is less than 1,500° C., no adequate sintering of the silicon nitride particles will proceed, such being undesirable, and if it exceeds 1,800° C., the silicon nitride particles tend to decompose, such being undesirable. If the time for maintaining at such a temperature is less than 1 hour, no adequate sintering of the particles to one another will proceed, such being undesirable. On the other hand, if it exceeds 12 hours, silicon nitride tends to decompose especially at a high temperature, such being undesirable. Further, the heat treatment in the first stage or in the second stage, may be carried out by once lowering the temperature at an intermediate point or may be carried out continuously without lowering the temperature.

The temperature raising rate at the time of the heat treatment may suitably be selected depending upon the size, shape, etc. of the green body, but it is preferably from 50 to 600° C./hr from the viewpoint of the nitriding rate or the pore diameters. Even in a temperature-raising process, so long as the temperature is within the temperature range defined for the first stage or the second stage, the time thereby passed will be included in the time for maintaining in the first or the second stage. Here, the nitrogen atmosphere is meant for an atmosphere which contains substantially nitrogen only and contains no oxygen, but it may contain other inert gases. The nitrogen partial pressure is preferably at least 50 kPa.

The porosity of the silicon nitride filter obtained by the present method is preferably from 45 to 80%. The porosity is measured by an Archimedes method. If the porosity is less than 45%, the pressure loss will be large, such being undesirable as a filter. On the other hand, if the porosity exceeds 80%, the strength tends to be low, such being undesirable as a filter.

The average pore diameter as measured by a mercury immersion method, of the silicon nitride filter obtainable by the present method, is preferably from 5 to 40 µm. If the average pore diameter is less than 5 µm, the pressure loss during the use of the filter, tends to be large, such being undesirable. If the average pore diameter exceeds 40 µm, it tends to be difficult to capture and remove fine particles in an exhaust gas, such as particulates, such being undesirable.

The sum of pore volumes of pores having pore diameters of from $0.5d_0$ to $1.5d_0$ is preferably at least 50 vol % of the sum of pore volumes of all pores, where do is the average pore diameter of the silicon nitride filter obtainable by the present method, whereby the proportion of pores contributing as a filter, in all pores, will be high, and the pressure loss can be lowered without lowering the efficiency for collection. As a result, it is possible to obtain a silicon nitride filter having a low pressure loss and a high collection efficiency without lowering the mechanical strength of the filter by unnecessarily increasing the porosity to attain a low pressure loss.

Now, the present invention will be described in further detail with reference to Examples. However, it should be understood that the present invention is by no means restricted to such specific Examples.

Now, Examples of the present invention (Examples 1, 2, 4 and 6) and Comparative Example (Examples 3 and 5) are shown. The obtained porous bodies were evaluated by the following evaluation methods.

Evaluation Methods

Porosity: calculated by an Archimedes method.

Average pore diameter: measured by a mercury porosimeter (AUTOSCAN-33, manufactured by Yuasa Ionics Inc.).

Crystal phase: identified by an X-ray diffraction apparatus (tradename: GAIGERFLEX RAD-IIA, manufactured by Rigaku Corporation).

Room temperature strength: From a filter prepared to have a honeycomb structure, a test specimen comprising 7×7 cells and having a length of 12 mm, was cut out, and a load was applied at an application rate of 0.5 mm/min in parallel with the extrusion direction, whereby the room temperature strength was measured as a compression strength.

EXAMPLE 1

A mixed powder comprising 70 mass % of metal silicon particles having an average particle diameter of 30 µm, wherein metal silicon particles having particle diameters of from 5 to 100 µm were 97 mass % in the entire metal silicon particles, and 30 mass % of spherical silica-alumina type glass hollow particles having an average particle diameter of 45 µm as a pore-forming agent, was prepared. To this mixed powder, magnesium nitrate was added so that it would be 1 part by mass per 100 parts by mass of metal silicon, to obtain a powder for a green body. To 100 parts by mass of the powder for a green body, 20 parts by mass of methylcellulose and 56 parts by mass of deionized water were added to obtain an extrusion molding material.

The above extrusion molding material was extrusion-molded into a green body of a honeycomb shape by a vacuum extruder and dried at 100° C. The dried honeycomb green body was heated in a nitrogen atmosphere to 1,350° C. at a temperature-raising rate of 2° C./min and then maintained for 4 hours to carry out heat treatment in the first stage. Further, it was heated to a temperature of 1,700° C. at a temperature-raising rate of 4° C./min and maintained for 4 hours to obtain a porous silicon nitride honeycomb sintered product. The obtained porous product was subjected to an X-ray diffraction measurement, whereby a diffraction peak of silicon nitride was identified, but no diffraction peak of metal silicon was identified. Further, the pore characteristics of the obtained porous product were such that the porosity was 60%, the average pore diameter was 12 µm, and the sum of pore volumes of pores having pore diameters of from 6 to 18 µm was 79 vol % of the sum of pore volumes of all pores. The room temperature strength of the obtained porous product was 15 MPa.

EXAMPLE 2

The operation was carried out in the same manner as in Example 1 except that in Example 1, instead of magnesium nitrate, magnesium hydroxide powder having an average particle size of 3 μm was added so that it would be 3 parts by mass per 100 parts by mass of metal silicon. The obtained porous product was subjected to an X-ray diffraction measurement, whereby a diffraction peak of silicon nitride was identified, but no diffraction peak of metal silicon was identified. Further, the pore characteristics of the obtained porous product were such that the porosity was 70%, the average pore diameter was 8 μm. and the sum of pore volumes of pores having pore diameters of from 4 to 12 μm was 76 vol % of the sum of pore volumes of all pores. The room temperature strength of the obtained porous product was 4 MPa.

EXAMPLE 3

The operation was carried out in the same manner as in Example 1 except that in Example 1, as the metal silicon particles, metal silicon particles having an average particle diameter of 4 μm, wherein metal silicon particles having particle diameters of from 5 to 100 μm were 40 mass % in the entire metal silicate particles, were used. The obtained porous product was subjected to an X-ray diffraction measurement, whereby a diffraction peak of silicon nitride was identified, but no diffraction peak of metal silicon was identified. Further, the pore characteristics of the obtained porous product were such that the porosity was 55%, the average pore diameter was 7 μm, and the sum of pore volumes of pores having pore diameters of from 3.5 to 10.5 μm, was 30 vol % of the sum of pore volumes of all pores. The room temperature strength of the obtained porous product was 40 MPa.

EXAMPLE 4

A mixed powder comprising 70 mass % of metal silicon particles having an average particle diameter of 55 μm, wherein metal silicon particles having particle diameters of from 45 to 75 μm were 99 mass % in the entire metal silicon particles, and 20 mass % of spherical silica/alumina type glass hollow particles having an average particle diameter of 30 μm as a pore-forming agent, was prepared. To this mixed powder, iron nitrate was added so that it would be 2 parts by mass to 100 parts by mass of metal silicon, to obtain a powder for a green body. To 100 parts by mass of the powder for a green body, 15 parts by mass of methylcellulose and 50 parts by mass of deionized water were added to obtain an extrusion molding material.

The above extrusion molding material was extrusion-molded into a green body of a honeycomb shape by a vacuum extruder and then dried at 100° C. The dried honeycomb green body was heated in a nitrogen atmosphere to 1,350° C. at a temperature-raising rate of 2° C./min and then maintained for 10 hours to carry out heat treatment in the first stage. Further, it was heated to a temperature of 1,700° C. at a temperature-raising rate of 4° C./min and maintained for 4 hours to obtain a porous silicon nitride honeycomb sintered product. The obtained porous product was subjected to an X-ray diffraction measurement, whereby a diffraction peak of silicon nitride was identified, but no diffraction peak of metal silicon was identified. Further, the pore characteristics of the obtained porous product was such that the porosity was 63%, the average pore diameter was 25 μm, and the sum of pore volumes of pores having pore diameters of from 12.5 to 37.5 μm was 72 vol % of the sum of pore volumes of all pores. The room temperature strength of the obtained porous product was 8 MPa.

EXAMPLE 5

The operation was carried out in the same manner as in Example 4 except that in Example 4, no iron nitrate was added. As a result of identification of the phase by X-ray, the obtained porous body was found to comprise silicon nitride, and a residue of silicon was observed. The obtained porous product had a porosity of 67% and an average pore diameter of 30 μm, and the sum of pore volumes of pores having pore diameters of from 15 to 45 μm, was 67 vol % of the sum of pore volumes of all pores. The strength of the obtained porous product was 4 MPa.

EXAMPLE 6

The operation is carried out in the same manner as in Example 4 except that in Example 4, as the pore-forming agent, an acrylic resin having an average particle diameter of 10 μm is used. By the X-ray diffraction measurement of the obtainable porous product, a diffraction peak of silicon nitride is identified, but no diffraction peak of silicon is observed. The obtainable porous product has a porosity of 64% and an average pore diameter of 20 μm, and the sum of pore volumes of pores having pore diameters of from 10 to 30 μm is 85 vol % of the sum of pore volumes of all pores. The strength of the obtained porous product is 10 MPa.

The present invention is a method for producing a silicon nitride filter, which is characterized in that metal silicon having a specific particle size distribution is used as the starting material, and it is nitrided to silicon nitride, and it is applicable to a method for producing a filter suitable as DPF, which is excellent in the mechanical properties and has a particularly low pressure loss and a high efficiency for collecting particulates.

The entire disclosure of Japanese Patent Application No. 2003-276170 filed on Jul. 17, 2003 including specification, claims and summary is incorporated herein by reference in its entirety.

What is claimed is:

1. A method for producing a silicon nitride filter, which comprises heat-treating in nitrogen a green body comprising from 60 to 95 mass % of metal silicon particles having an average particle diameter of from 10 to 75 μm, wherein particles having particle diameters of from 5 to 100 μm are at least 70 mass % in the entire metal silicon particles, and from 5 to 40 mass % of a pore-forming agent, to convert metal silicon substantially to silicon nitride filter, wherein the green body comprises an inorganic acid salt, which is a nitrate, a chloride or a sulfate, wherein the inorganic salt comprises at least one metal element selected from the group consisting of Mg, Ca, Fe, and Cu, and wherein the inorganic acid salt is added in an amount of from 0.1 to 3 parts by mass as a metal element, per 100 parts by mass of the amount of the metal silicon particles.

2. The method for producing a silicon nitride filter according to claim 1, wherein the inorganic acid salt is water-soluble.

3. The method for producing a silicon nitride filter according to claim 1, wherein as the pore-forming agent, metal oxide ceramic hollow particles and/or a dissipative pore-forming agent is used.

4. The method for producing a silicon nitride filter according to claim 1, wherein the filter has a porosity of from 60 to 70%.

5. The method for producing a silicon nitride filter according to claim 1, wherein the filter has an average pore diameter of from 8 to 30 μm as measured by a mercury immersion method.

6. The method for producing a silicon nitride filter according to claim 1, wherein the sum of pore volumes of pores having pore diameters of from $0.5\, d_0$ to $1.5\, d_0$ is at least 67 vol % of the sum of pore volumes of all pores, where $d_0$ is the average pore diameter of the filter.

7. The method for producing a silicon nitride filter according to claim 1, wherein the heat treatment is conducted in two stages in such a manner that the heat treatment in the first stage is carried out by maintaining the green body in a nitrogen atmosphere at a temperature of from 1200 to 1400° C. for from 4 to 12 hours, and then, the heat treatment in the second stage is carried out by maintaining it within a temperature range of from 1500 to 1800° C. for from 1 to 12 hours.

* * * * *